United States Patent [19]

Jaaskelainen

[11] Patent Number: 5,301,348
[45] Date of Patent: Apr. 5, 1994

[54] DYNAMIC PROGRESS MARKING ICON

[75] Inventor: William Jaaskelainen, Oronoco, Minn.

[73] Assignee: International Business Machines Corporation, Armonk, N.Y.

[21] Appl. No.: 915,774

[22] Filed: Jul. 16, 1992

Related U.S. Application Data

[63] Continuation of Ser. No. 325,600, Mar. 20, 1989, abandoned.

[51] Int. Cl.$^5$ ............................................. G06F 11/32
[52] U.S. Cl. .................................. 395/800; 364/237.2; 364/264; 364/264.5; 364/DIG. 1; 395/700
[58] Field of Search ........................ 395/800, 700, 159

[56] References Cited

U.S. PATENT DOCUMENTS

| | | | |
|---|---|---|---|
| D. 295,763 | 5/1989 | Wells-Papanek et al. | D18/27 |
| 4,034,353 | 7/1977 | Denny | 364/200 |
| 4,200,896 | 4/1980 | Baumann | 364/570 |
| 4,203,103 | 5/1980 | Osada et al. | 340/753 |
| 4,333,144 | 6/1982 | Whiteside | 364/200 |
| 4,415,974 | 11/1983 | Laug et al. | 364/426 |
| 4,623,988 | 11/1986 | Paulson | 364/900 |
| 4,628,470 | 12/1986 | Baumann | 364/567 |
| 4,638,436 | 1/1987 | Badger et al. | 364/414 |
| 4,730,262 | 3/1988 | Watanabe et al. | 364/521 |
| 4,899,136 | 2/1990 | Beard | 364/521 |
| 4,935,870 | 6/1990 | Burk | 364/200 |

OTHER PUBLICATIONS

Hard Disk Smarts by Chris A. Bosshardt, pub. 1988 Wiley & Sons pp. 249, 250, 265-286.

*Primary Examiner*—Eric Coleman
*Attorney, Agent, or Firm*—Curtis G. Rose; Steven W. Roth

[57] ABSTRACT

A dynamic progress marker icon is disclosed that dynamically changes to mark the progress of a task. In this manner, the user is kept informed of the status of a task being performed without resorting to language sensitive messages such as "Now processing object number 12 of 100". The icon does not require a graphics display to be used and therefore can be used on both graphics and non-graphics displays. The icon of the prepared embodiment has five rows consisting of four percent (%) symbols surrounded by a border. At the beginning of a task, a task monitor quantifies the task into substantially equivalent task work units. All twenty "%" symbols are present and displayed to the user. When the task monitor determines that one task work unit has completed, one "%" symbol is replaced in the icon by a replacement character, such as a blank or null character. The replacement of one "%" symbol each time a task work unit completes continues until all of the "%" symbols are replaced, indicating 100% completion of the task. The order in which symbols inside the icon are replaced is determined by a pattern array and can be modified if desired. The symbols used inside the icon and for the border are selected to be available in virtually all languages, and can also be modified to meet the needs of a particular user.

13 Claims, 8 Drawing Sheets

DYNAMIC PROGRESS MARKING ICON

This is a continuation of U.S. patent application Ser. No. 325,600, now abandoned.

FIELD OF THE INVENTION

This invention relates to the data processing field. More particularly, this invention is an icon which dynamically marks the progress of a monitored computer task. The icon of the invention is displayed to the computer user, thereby keeping him informed as to the progress of a task without resorting to language sensitive messages.

BACKGROUND OF THE INVENTION

Computers have dutifully performed billions of tasks commanded of them from computer users worldwide. Many of these tasks were quite simple for the computer to perform, and were completed with results displayed to the user almost instantaneously. However, some tasks requested by users of computers are much more complex, and require a considerable amount of processing power and time to complete.

Some of these complex tasks can take several seconds, minutes, or even several hours or days to complete. Even though a computer may be working frantically under the covers to satisfy a complex task requested by a user, the user quite often is given no indication as to what progress, if any, is being made in completing the task. Often after a large amount of time has elapsed, a user will erroneously conclude that the computer has encountered an error and has "hanged" or "gone casters up", and needs to be restarted. This scenario is frustrating to a computer user, who feels uninformed as to the progress of his requested task. More importantly, valuable computer resources are wasted if a computer is erroneously restarted in the middle of a complex task just because of poor or non-existent progress feedback to the user.

Attempts to address this problem have so far been quite primitive. Some programs display only a number, such as 100 or 10, and count down to zero as a task is being processed. Other programs display a message, such as "Working on your request" over and over again, alternately displaying the message highlighted and non-highlighted. Neither of these techniques truly inform the user as to the progress of a task—they merely give the user something that changes on the screen to look at. Although these techniques may help in discouraging a user from restarting a system for awhile, the feedback provided does not give a user a warm feeling that progress is really being made on his task.

A better attempt at solving this problem is to repeatedly display a truly useful message to the user, such as "Now processing object number 12 out of 100", or "This task will complete in 5.05 minutes". Unfortunately, these messages need to be translated into several different languages when the computer is sold around the world, and this requirement can be quite burdensome and yield unpredictable results. In addition, these messages can be quite wasteful of space, and some languages require more space than other languages to communicate the same meaning.

SUMMARY OF THE INVENTION

It is a principle object of the invention to provide feedback to a computer user as to the progress of a task.

It is another object of the invention to provide feedback to a computer user as to the progress of a task in an efficient manner.

It is another object of the invention to provide feedback to a computer user as to the progress of a task in a manner that does not require burdensome and unpredictable language translations.

These and other objects are accomplished by the dynamic progress marker icon disclosed herein.

A dynamic progress marker icon is disclosed that dynamically changes to mark the progress of a task. In this manner, the user is kept informed of the status of a task being performed without resorting to language sensitive messages such as "Now processing object number 12 of 100". The icon does not require a graphics display to be used and therefore can be used on both graphics and non-graphics displays. The icon of the prepared embodiment has five rows consisting of four percent (%) symbols surrounded by a border. At the beginning of a task, a task monitor quantifies the task into substantially equivalent task work units. All twenty "%" symbols are present and displayed to the user. When the task monitor determines that one task work unit has completed, one "%" symbol is replaced in the icon by a replacement character, such as a blank or null character. The replacement of one "%" symbol each time a task work unit completes continues until all of the "%" symbols are replaced, indicating 100% completion of the task. The order in which symbols inside the icon are replaced is determined by a pattern array which can be modified if desired. The symbols used inside the icon and for the border are selected to be available in virtually all languages, and can also be modified to meet the needs of a particular user.

DESCRIPTION OF THE PREFERRED EMBODIMENT

Figure 1:
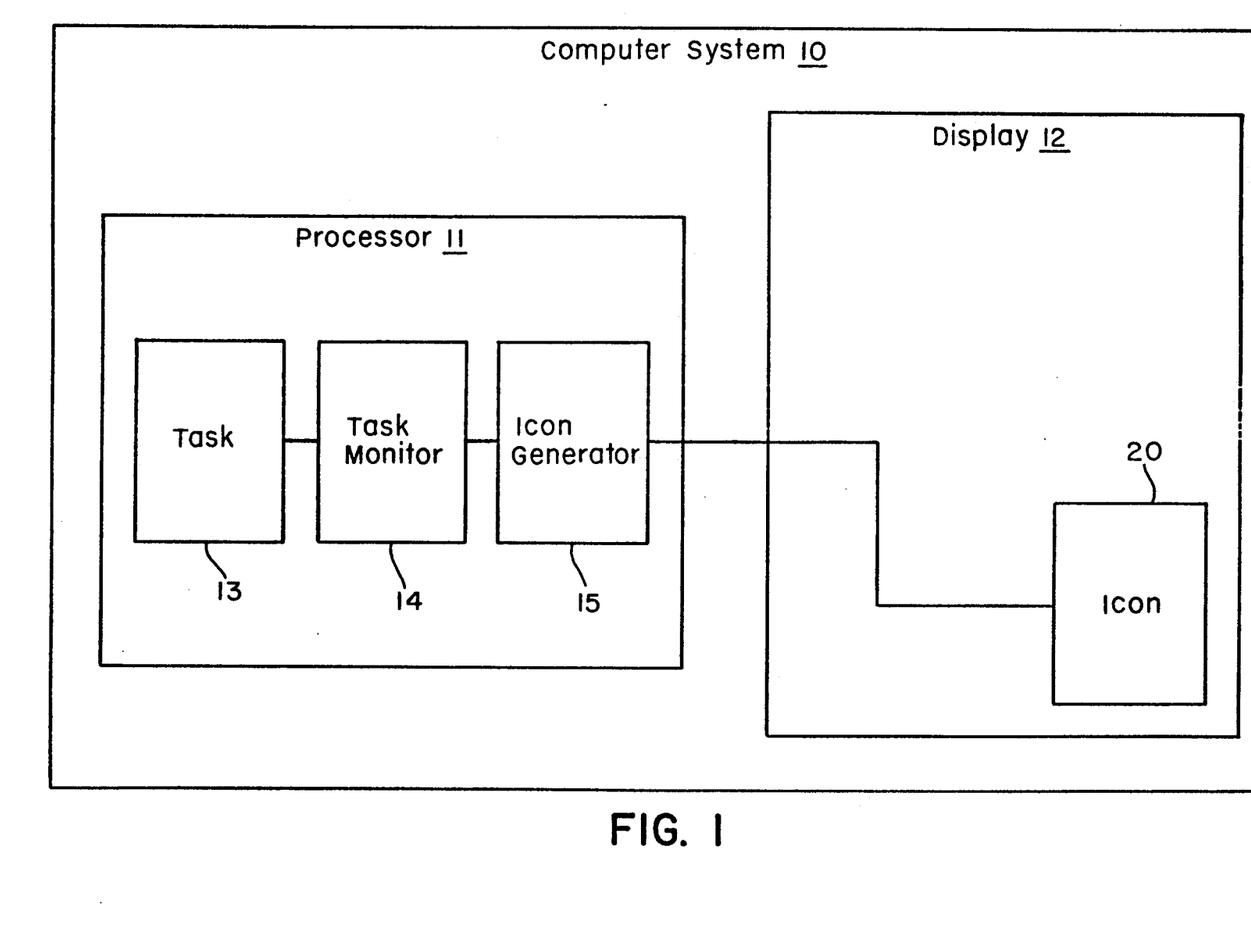
FIG. 1 shows a block diagram of the computer system of the invention.

FIG. 1 shows a block diagram of the computer system of the invention. Computer system 10 contains processor 11 and display 12. Processor 11 contains task 13, task monitor 14, and icon generator 15. Icon 20 is displayed on display 12.

Computer system 10 can be any computer system, such as a personal computer, a minicomputer, or a mainframe computer. In the preferred embodiment, computer system 10 is an IBM System/36 with an attached display. Note that processor 11 can be directly connected to display 12, or connected remotely over communications lines such as telephone lines, local area networks, etc. Note also that although only processor 11 is shown, more than one processor and/or special purpose hardware may be used to perform the function of task 13, task monitor 14, or icon generator 15.

Task 13 represents the item of work requested of computer system 10 by the computer user. An example of a task would be a request to back up a hard disk to magnetic tape. Task monitor 14 quantifies the amount of work required to complete task 13, and divides this quantified workload into a plurality of substantially equivalent task work units. Task monitor 14 then monitors task 13 and sends a message to icon generator 15 each time a task work unit has been completed. Responsive to receiving the message, icon generator 15 updates icon 20 displayed to the user on display 12 by replacing one of the symbols contained in icon 20. The operation of computer system 10 will be described in more detail in conjunction with the discussion of FIGS. 5–8.

Figure 2:
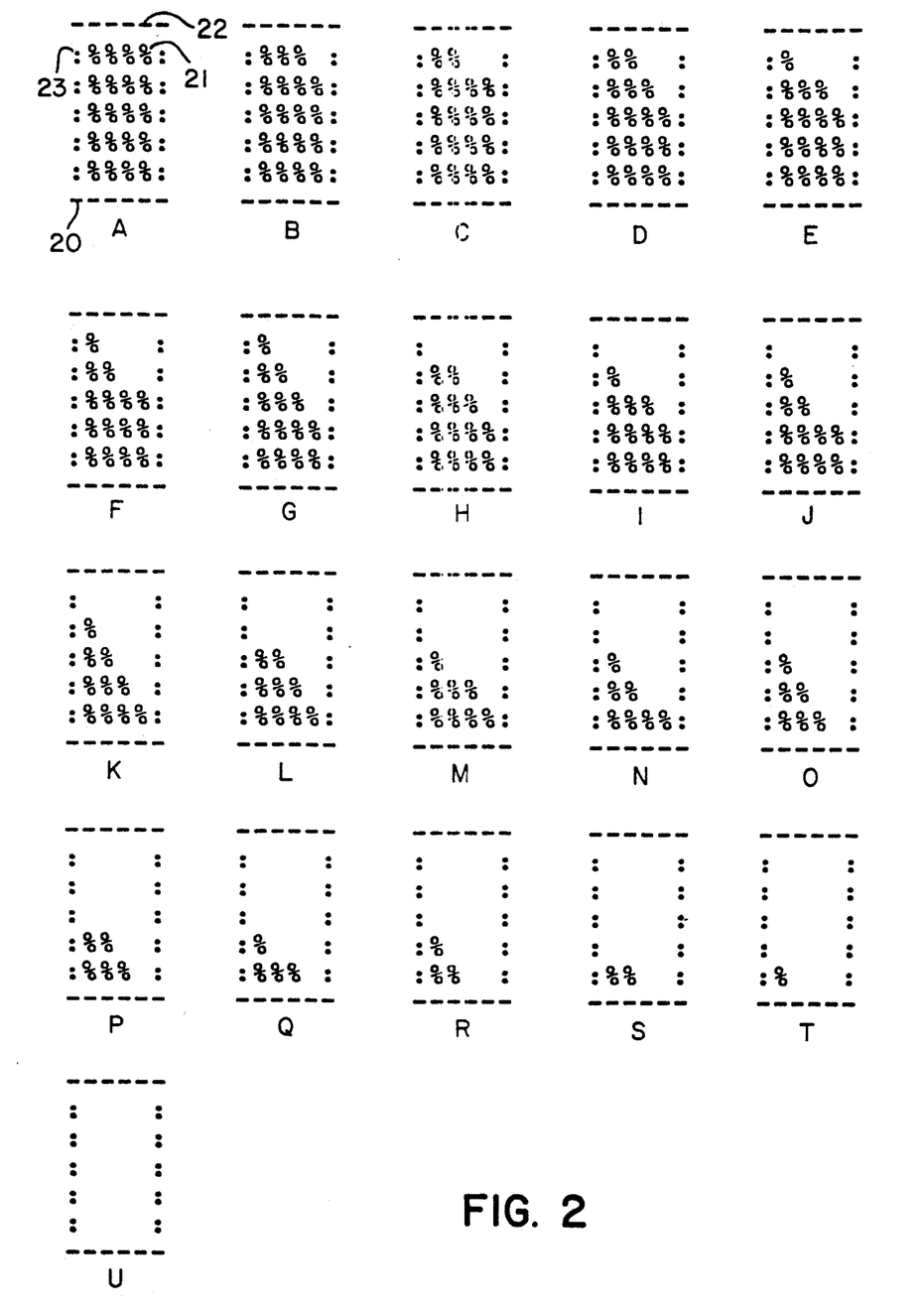
FIGS. 2A, 2B, 2C, 2D, 2E, 2F, 2G, 2H, 2I, 2J, 2K, 2L, 2M, 2N, 2O, 2P, 2Q, 2R, 2S, 2T, 2U show the icon of the preferred embodiment of the invention as displayed to a user as a monitored task progresses.

FIGS. 2A–2U shows how icon 20 is displayed to a user as task 13 progresses. Icon 20 contains a plurality of symbols 21 arranged in rows and columns. In the preferred embodiment, symbols 21 are all represented by the "percent sign" character (ASCII code 037, EBCDIC code 6C) although this can be changed by the user if desired. In addition, symbols 21 could be represented by a plurality of different characters. Also, the character or characters used to represent symbols 21 could be graphics or non-graphics characters. The non-graphics character "%" was chosen in the preferred embodiment to represent symbols 21 because it could be used on either graphics or non-graphics displays. In addition, the "%" character was available in substantially all character sets worldwide. Since the "%" character is used to represent a percentage of a whole, it was a good choice to represent symbols 21.

Symbols 21 in icon 20 are surrounded by a border made up of horizontal border segments 22 and vertical border segments 23. Although icon 20 can be used without a border at all, a border is used in the preferred embodiment to enhance usability. In the preferred embodiment, horizontal border segments 22 are represented by the "-" character (ASCII code 045, EBCDIC code 60) although this can be changed by the user if desired. Another possible character that could be used is the "_" character (ASCII code 095, EBCDIC code 6D). In addition, horizontal border segments 22 could be represented by a plurality of different characters. For example, the corners may be represented by a different character than the middle section. Also, the character or characters used to represent horizontal border segments 22 could be graphics or non-graphics characters. The non-graphics character "-" was chosen in the preferred embodiment to represent horizontal border segments 22 because it could be used on either graphics or non-graphics displays. In addition, the "-" character was available in substantially all character sets worldwide.

Vertical border segments 23 are represented by the ":" character ASCII code 058, EBCDIC code 7A) in the preferred embodiment, although this can be changed by the user if desired. Other possible character that could be used are the "(" character (ASCII code 040, EBCDIC code 4D), or the ")" character (ASCII code 041, EBCDIC code 5D). In addition, vertical border segments 23 could be represented by a plurality of different characters. Also, the character or characters used to represent vertical border segments 23 could be graphics or non-graphics characters. The non-graphics character ":" was chosen in the preferred embodiment to represent vertical border segments 23 because it could be used on either graphics or non-graphics displays. In addition, the ":" character was available in substantially all character sets worldwide.

FIG. 2A shows how icon 20 is displayed to the user when a task has just begun. In the preferred embodiment, icon 20 is displayed in the lower right hand corner of display 12 (FIG. 1), and remains in the same location for the duration of the task. Of course, icon 20 could be displayed in a different location of display 12 or move from location to location as the task progresses.

Note that all symbols 21 are represented by the "%" characters in the preferred embodiment shown in FIG. 2A. When task monitor 14 indicates to icon generator 15 that one task work unit has been completed, icon generator 15 replaces one "%" character from icon 20 with a replacement character, such as a blank or null character. FIG. 2B shows what icon 20 looks like after one task work unit has been completed.

FIGS. 2C through 2T, respectively, show how icon 20 is displayed to the user after each additional task work unit has been completed. The order in which symbols 21 are replaced is determined by a programmable pattern array, which is shown in FIG. 4B and will be discussed in more detail later.

FIG. 2U shows how icon 20 is displayed to the user after the last task work unit has been completed. Note that all symbols 21 have been replaced, and only the border remains. Icon 20 shown in FIG. 2U is displayed to the user momentarily to indicate completion of the task, and then the border is removed, thereby causing icon 20 to disappear from display 12.

Figure 3A:
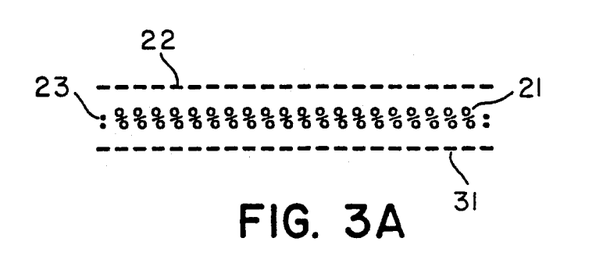
FIGS. 3A, 3B, 3C, 3D show the icons of various alternate embodiments of the invention.

FIG. 3A shows icon 31 of an alternate embodiment of the invention. Icon 31 still contains symbols 21, horizontal border segments 22 and vertical border segments 23. Note that instead of having symbols 21 arranged in rows and columns, they are arranged horizontally. The preceding discussion relating to icon 20 of FIGS. 2A–2U is equally applicable to icon 31 shown in FIG. 3A.

Figure 3B:
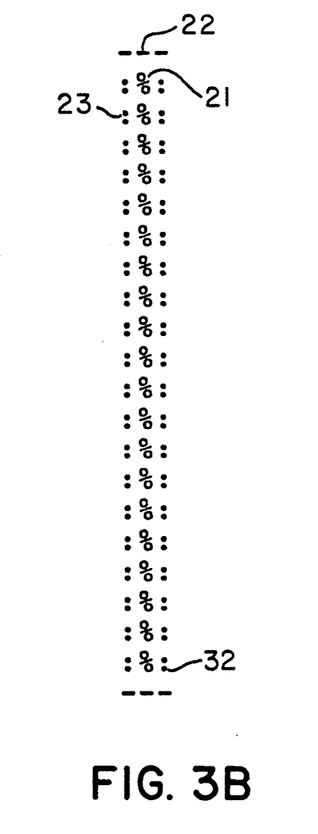

FIG. 3B shows icon 32 of an alternate embodiment of the invention. Icon 32 still contains symbols 21, horizontal border segments 22 and vertical border segments 23. Note that instead of having symbols 21 arranged in rows and columns, they are arranged vertically. The preceding discussion relating to icon 20 of FIGS. 2A–2U is equally applicable to icon 32 shown in FIG. 3B.

Figure 3C:
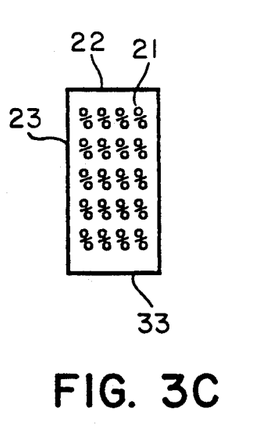

FIG. 3C shows icon 33 of an alternate embodiment of the invention. Icon 33 still contains symbols 21, horizontal border segment 22 and vertical border segment 23. Note that horizontal border segments 22 are represented by a plurality of characters: the " ┌ " character (ASCII code 218), the "-" character (ASCII code 196), the " ┐ " character (ASCII code 191), the " L " character (ASCII code 192), and the " ┘ " character (ASCII code 217). Vertical border segments 23 are represented on the "|" character (ASCII code 179). Icon 33 uses non-graphics extended ASCII codes available for use by the IBM PC, PC/XT, PC/AT, PS/2, and associated compatibles. Icon 33 may be preferred over icon 20 in computing environments where the characters used to make up the border are available for use.

Figure 3D:
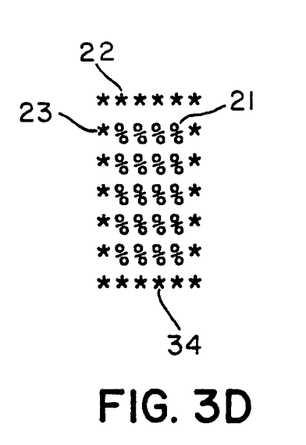

FIG. 3D shows icon 34 of an alternate embodiment of the invention. Icon 34 still contains symbols 21, horizontal border segments 22 and vertical border segments 23. Note that both horizontal border segments 22 and vertical border segments 23 are made up a single character, a "*" (ASCII code 042, EBCDIC code 5C)

Figure 4A:
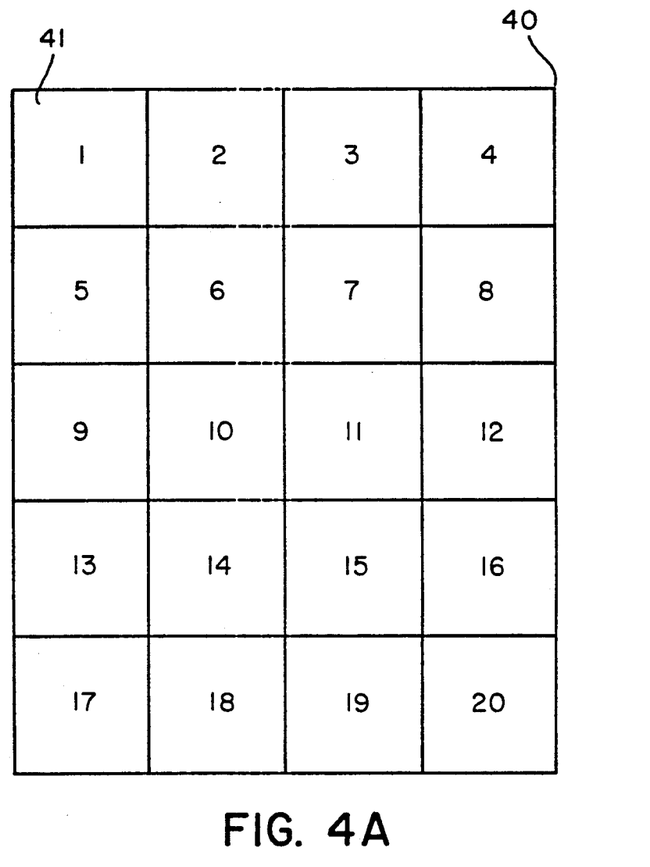
FIGS. 4A, 4B show the icon matrix and programmable pattern array of the invention that determines the order in which the symbols inside the icon are replaced.
Figure 4B:
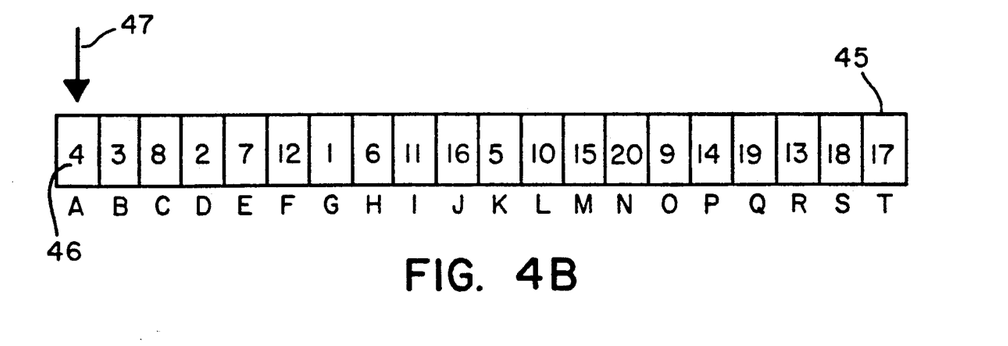

FIGS. 4A–4B show the icon matrix and programmable pattern array of the invention that determines the order in which symbols 21 inside icon 20 are replaced. FIG. 4A shows icon matrix 40. Icon matrix 40 is arranged in rows and columns corresponding to the rows and columns of icon 20. Icon matrix 40 contains a plurality of cells 41. Each cell corresponds to a symbol 21 of icon 20. The cell numbers shown in cells 41 indicate the relative position of the cell in icon matrix 40.

FIG. 4B shows programmable pattern array 45. Pattern array 45 contains a plurality of array locations 46A–T. Each array location contains the cell number of a cell 41 in icon matrix 40. Array location 46A in pattern array 45 indicates the cell number for which the first corresponding symbol 21 of icon 20 is replaced when the first work unit has been completed. For example, the cell number in array location 46A is a "four". This indicates that the first symbol to be replaced in icon 20 is located in cell number four of icon matrix 40. Cell number four is located in the upper right hand corner of icon matrix 40. FIG. 2B shows what icon 20 looks like when the symbol located in cell number four has been replaced.

Pattern array 45 contains pointer 47. Pointer 47 indicates the array location to be processed next. Pointer 47 is incremented to the next array location each time a symbol 21 is replaced from icon 20. Pattern array 45 shows that the symbol corresponding to cell number four is replaced when pointer 47 is pointing to array location 46A. Then pointer 47 is incremented to the next array location 46B. The symbol corresponding to cell number three is replaced next, followed by cell numbers eight, two, seven, twelve, and so on. The symbol corresponding to cell number seventeen is the last symbol to be replaced. Note that when icon 20 looks like that shown in FIG. 2A, pointer 47 is pointing to array location 46A. Likewise, when icon 20 looks like that shown in FIG. 2B, pointer 47 is pointing to array location 46B, and so on, until when icon 20 looks like that shown in FIG. 2T, pointer 47 is pointing to array location 46T.

Note that pattern array 45 can be modified as desired to create a different order of replacing characters from icon 20 other than that indicated in FIG. 4B. Note also that pattern array 45 would be modified if icon 31 or icon 32 of FIGS. 3A or 3B were used instead of icon 20. Although pattern array 45 contains twenty array locations in the preferred embodiment, it can be shorter or longer depending on the number of symbols 21 contained in the icon.

FIGS. 5–8 show a flow chart of the generation of the dynamic progress marking icon of the invention. Processing begins in block 60 of FIG. 5, where the quantify task work unit subroutine is called to quantify a task work unit of task 13. Task monitor 14 (FIG. 1) is responsible for performing this quantification.

The quantify task work unit subroutine of FIG. 6 will now be discussed. Task monitor 14 first determines in block 61 if this particular task can be quantified by an estimate of time required to complete the task. If an estimate of the time required to complete this task is ascertainable, either because it is known or can be determined, the estimated task completion time is saved in time units, such as seconds, in block 62. Block 63 divides the total task completion time into a plurality of substantially equal task work units. Each task work unit corresponds to one of the symbols 21 of icon 20. For example, if task monitor 13 is able to ascertain that task 12 will take approximately sixty seconds to complete, block 63 divides sixty seconds by twenty, the number of symbols of the icon. This results in a task work unit of three seconds. Therefore, a symbol 21 of icon 20 will be erased every three seconds to indicate the completion of another task work unit. After block 63 determines the duration of a task work unit, control is returned in block 64 to FIG. 5.

If block 61 indicates that the estimated time required to complete the task is not ascertainable, block 65 looks to see if the number of work items in the task is ascertainable. For example, in the IBM System/3x and AS/400 environment, a work item is referred to as an object. Other definitions of work items could be easily made to fit a particular application. If the number of work items is ascertainable, this number is saved in block 66. Block 67 divides the number of work items into a plurality of substantially equal task work units, similar to the function of block 63. Each task work unit corresponds to one of the symbols 21 of icon 20. For example, if task monitor 13 is able to ascertain that task 12 contains two hundred work items, block 67 divides two hundred by twenty, the number of symbols of icon 20. This results in a task work unit of ten work items. Therefore, a symbol 21 of icon 20 will be replaced every ten work items to indicate the completion of another task work unit.

If the quantified task work unit is not an integer multiple of work items or time units it is rounded up or down to the nearest number of work items or time units. The last task work unit covers the remaining work items, time units, or fractions thereof.

Note that in some examples, more than one symbol will be replaced for a single work item or time unit. For example, if task 12 contains ten work items, block 67 divides ten by twenty which results in a task work unit of one-half of a work item. Therefore, two symbols of icon 20 will be replaced for each work item.

Figure 5:
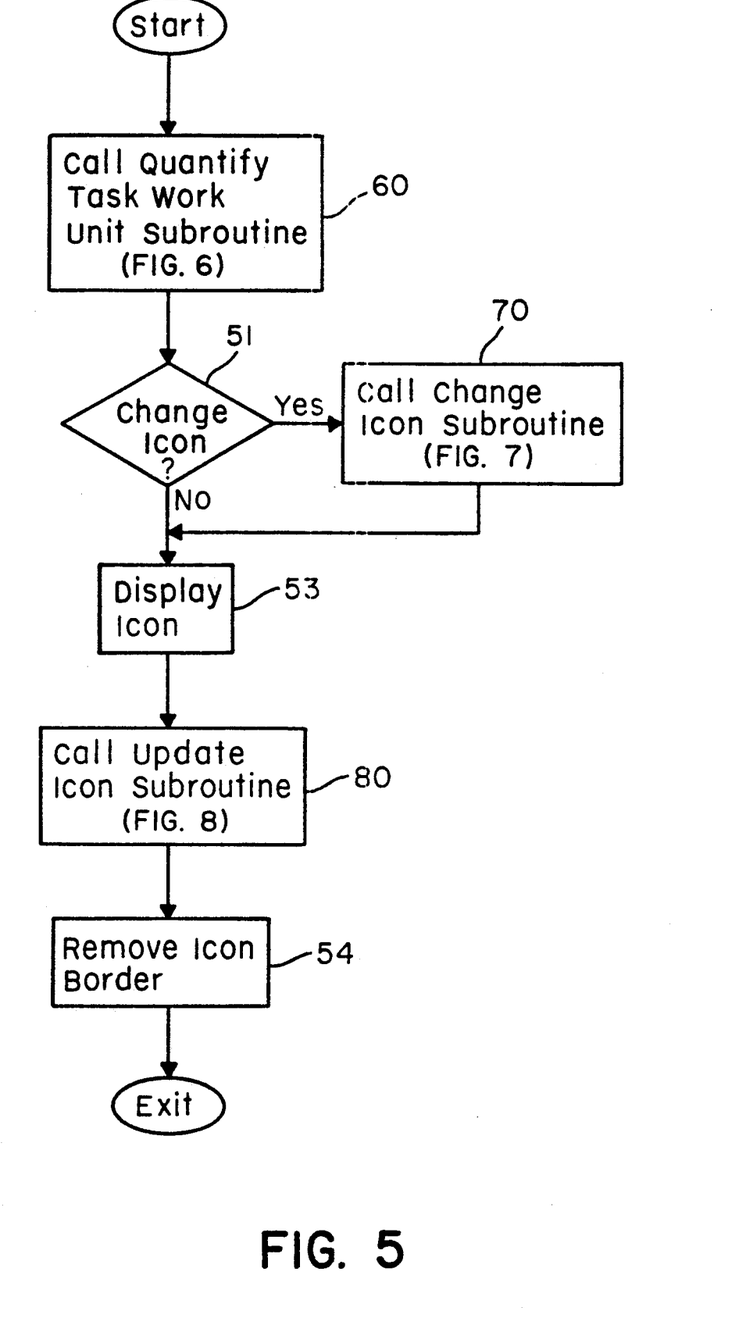
FIGS. 5, 6, 7, 8 show a flow chart of the generation of the dynamic progress marking icon of the invention.
Figure 6:
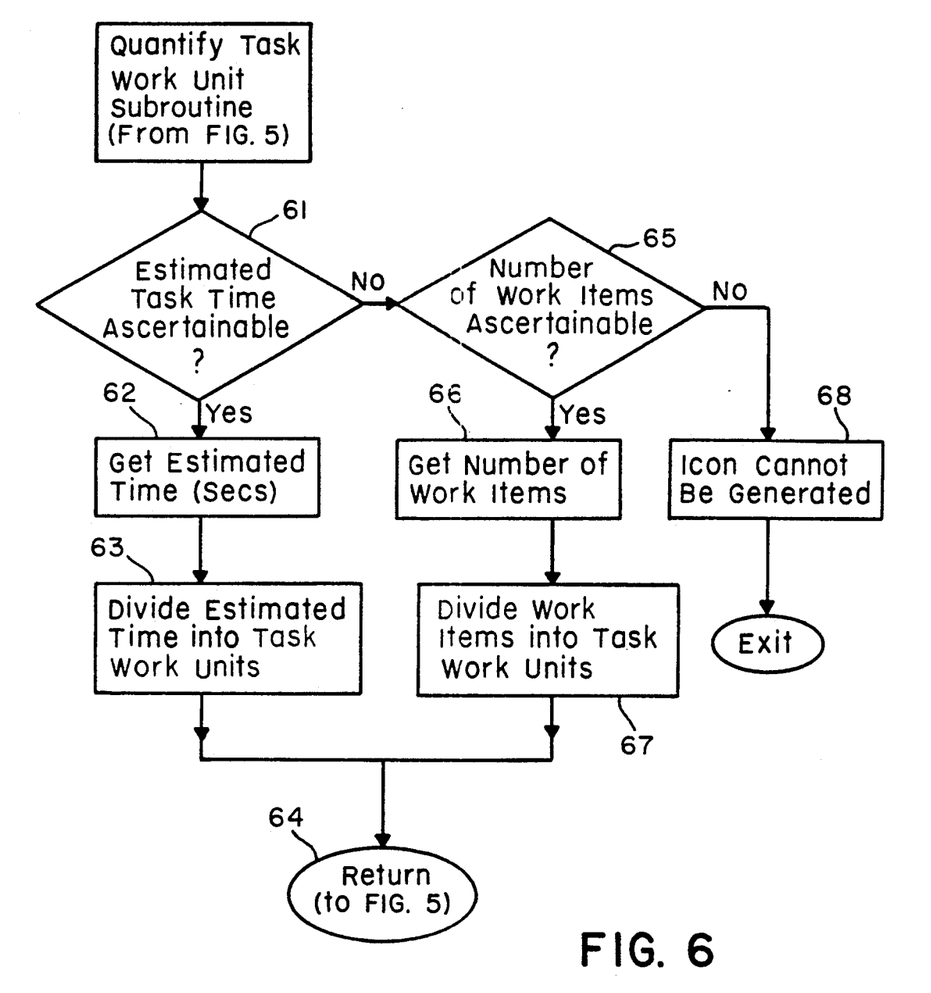

After block 67 determines the duration of a task work unit, control is returned in block 64 to FIG. 5. If block 65 is answered negatively, an icon cannot be generated and the program ends in block 68.

Figure 7:
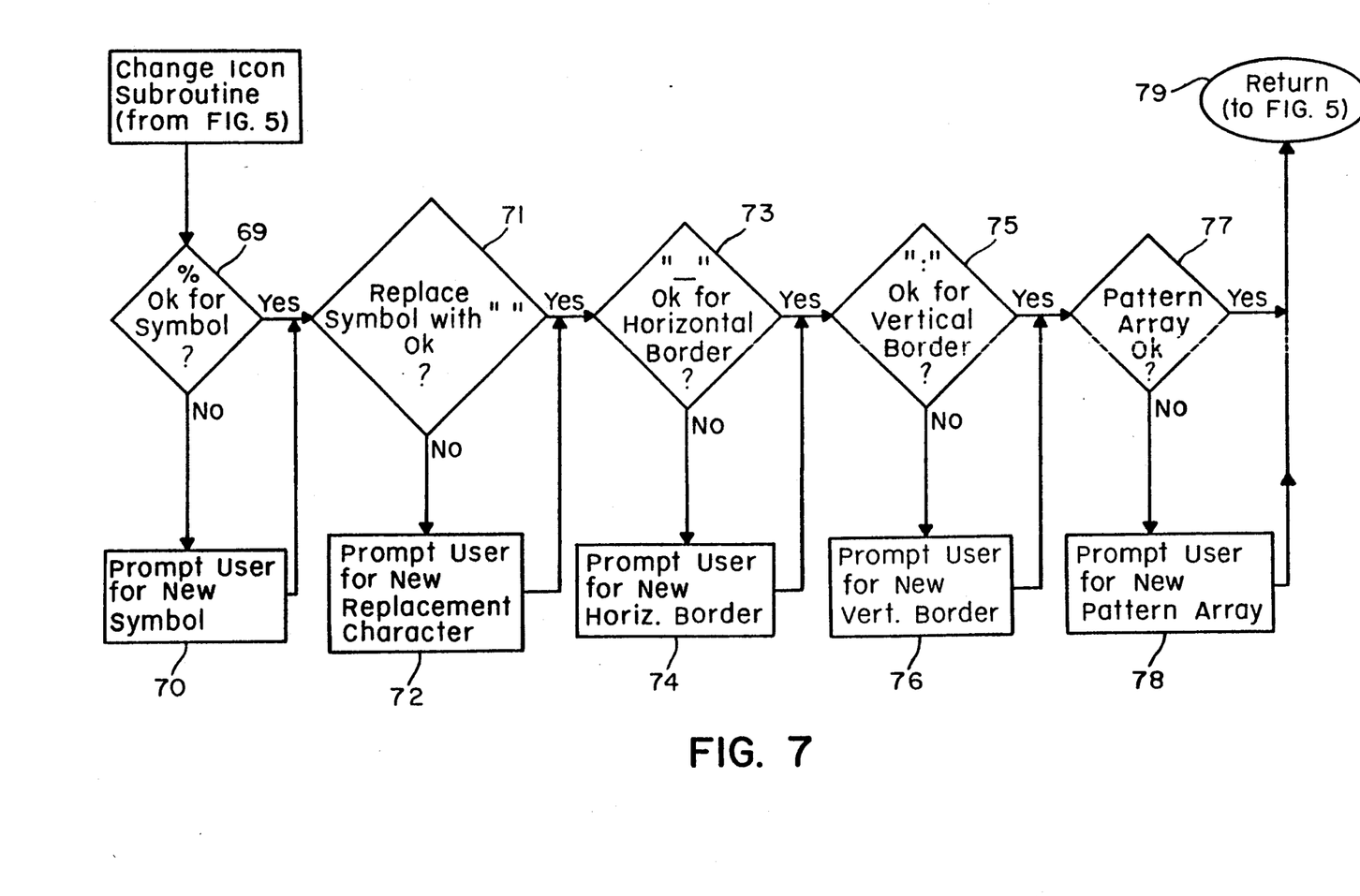

Referring again to FIG. 5, block 51 checks to see if the user wants to change the character representing symbols 21, horizontal border 22, or vertical border 23 of icon 20, or change pattern array 45. Block 51 would normally be defaulted to answer no and control would move on to block 52. If block 51 is answered affirmatively, the change icon subroutine of FIG. 7 is called in block 70. Icon generator 15 (FIG. 1) is responsible for the changing the icon defaults if desired by the user.

The change icon subroutine of FIG. 7 will now be discussed. Icon generator 15 first asks the user if the "%" character is acceptable for symbol 21 in block 69. If not, the user is prompted for a new character in block 70. Note that the new character can be either a graphics or a non-graphics character.

Block 71 asks the user if the replacement character of "" (null or blank) is acceptable. If not, block 72 prompts the user for a new replacement character. Note that if a replacement character of blank or null or other non-displayable character is used, the user perceives that the symbol has been erased. If the replacement character is displayable, an entirely different perception is given to the user. For example, if a "*" was the replacement character, a "*" would replace a "%" each time a task work unit completed. FIG. 2R, for instance, would have three "%" symbols and seventeen "*" characters.

Block 73 asks the user if the "-" character is acceptable for horizontal border 22. If not, the user is prompted for a new character in block 74. Note that the new character can be either a graphics or a non-graphics character. Block 75 asks the user if the ":" character is acceptable for vertical border 23. If not, the user is prompted for a new character in block 76. Note again that the new character can be either a graphics or a non-graphics character.

Block 77 asks the user if the default pattern array 45 (indicating the order in which symbols 21 are replaced from icon 20) is acceptable. If not, the user is prompted for a new pattern array in block 78.

Flow of control returns to FIG. 5 in block 79. The change icon subroutine would get slightly more complex if it was desirable to use more than one character for symbol 21 or horizontal border 22 or vertical border 23 for the icon, such as icon 33 (FIG. 3C), but this modification is well within the scope of those skilled in the art.

Referring again to FIG. 5, icon generator 15 (FIG. 1) displays icon 20 to the user on display 12 in block 53. At the beginning of the task, icon 20 shown in FIG. 2A is displayed. Block 80 then calls the update icon subroutine. Icon generator 15 (FIG. 1) is responsible for updating the icon.

Figure 8:
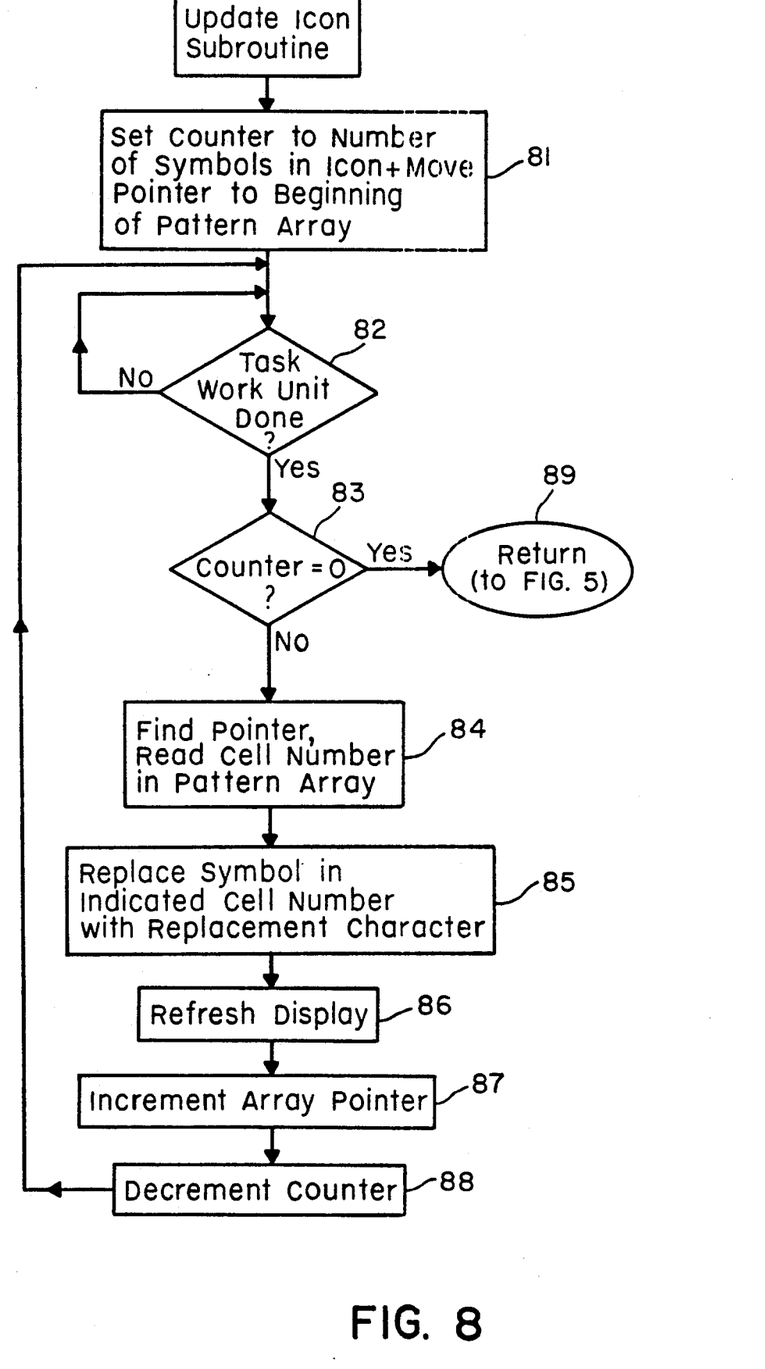

The update icon subroutine of FIG. 8 will now be discussed. Block 81 sets a counter to be equal to the number of symbols 21 in icon 20, and moves pointer 47 to array location 46A in pattern array 45. In the preferred embodiment, the counter would be set to twenty. Block 82 continually checks to see if task monitor 14 has told task generator 15 that a task work unit has been completed. If so, block 83 checks to see if the counter is equal to zero. If the counter is not equal to zero, block 84 finds array pointer 47 in pattern array 45 (FIG. 4B) and reads the cell number stored in the indicated array location 46. Here, pointer 47 is pointing to array location 46A, and cell number four is read. Block 85 replaces the symbol contained in cell number four with the replacement character. If the replacement character is a blank or null or other non-displayable character, the symbol will appear to the user to have been erased. Block 86 refreshes display 12, thereby displaying to the user the updated icon. Block 87 increments array pointer 47 to the next array location 46B. Block 88 decrements the counter by one, and the flow of control returns to block 82, where the subroutine waits until the next task work unit is done. As each task work unit is completed, blocks 83-88 are performed, and icon 20 as shown in FIGS. 2B-2U is generated one by one and displayed to the user. When block 83 determines that the counter is zero, indicating that the task has been completed and the last symbol 21 has been replaced in icon 20, the subroutine returns in block 89 to block 54 of FIG. 5, where the border of icon 20 is removed.

In the situation where more then one symbol is replaced for a single work item or time unit, block 82 is repeatedly answered affirmatively and blocks 83-88 are performed until the correct number of symbols are replaced. For example, if task 12 contains ten work items, a task work unit is equal to one half of a work item. Therefore, each time a work item is done, task monitor 14 informs icon generator 15 that two task work units have been completed. Blocks 82-88 are performed twice, thereby replacing two symbols. Block 82 then waits for an indication that two more task work units have been completed.

While this invention has been described with respect to the preferred and alternate embodiments, it will be understood by those skilled in the art that various changes in detail may be made therein without departing from the spirit, scope and teaching of the invention. For example, an attribute, such as blinking, underscore or highlight, could be used to indicate the next symbol to be replaced from the icon. In addition, the icon drawn in FIG. 2U can indicate the beginning of a task and symbols can be added to the icon instead of erased as the task progresses. This could be done easily by reversing the order of the pattern array, defining the symbol as " " (null or blank), and defining the replacement character as "%". Accordingly, the herein disclosed is to be limited only as specified in the following claims.

What is claimed is:

1. A method for using an icon to inform a user of the progress of any task on a computer system, said computer system having a plurality of tasks, said icon having a plurality of symbols, said method comprising the machine-executed steps of:

determining, in response to each request to perform any task of said plurality of tasks whether an amount of work required to complete a particular task can be quantified and if it is determined that said amount of work can be quantified:

quantifying said amount of work required to complete said particular task, said particular task being one of said plurality of tasks;

dividing said quantified work into a plurality of task work units, wherein each of said task work units corresponds to one of said plurality of symbols in said icon;

presenting said icon on a computer display to said user, said icon containing progress information about said particular task, said progress information being represented as a uniform indication of progress that is independent from said particular task's function;

monitoring the progress of said particular task;

replacing one of said plurality of symbols with a replacement character when one task work unit has been completed; and repeating said replacing step as said particular task progresses until all of said plurality of symbols have been replaced, thereby indicating the completion of said particular task; and removing said icon from said computer display.

2. The method of claim 1, wherein said quantifying step identifies the number of work items that need to be processed in order to perform said particular task.

3. The method of claim 1, wherein said quantifying step identifies the number of objects that need to be processed in order to perform said particular task.

4. The method of claim 1, wherein said quantifying step identifies the estimated amount of time required to perform said particular task.

5. The method of claim 1, wherein said replacing step further comprises the step of:

checking a pointer in a pattern array, said pointer identifying the array location which contains the cell number of the next one of said plurality of symbols of said icon to be replaced.

6. The method of claim 5, wherein said replacing step further comprises the machine-executed step of:
moving said pointer in said pattern array to the next array location.

7. The method of claim 1, further comprising the machine-executed step of:
selecting a single character code to be used for all of said plurality of symbols.

8. The method of claim 1, further comprising the machine-executed step of:
selecting a plurality of character codes to be used for said plurality of symbols.

9. The method of claim 1, further comprising the machine-executed step of:
selecting a single non-graphics character code to be used for all of said plurality of symbols.

10. The method of claim 1, further comprising the machine-executed step of:
selecting a non-displayable character for said replacement character.

11. The method of claim 1, further comprising the machine-executed step of:
selecting a displayable character for said replacement character.

12. The method of claim 1, further comprising the machine-executed step of:
initializing a pattern array to indicate the order in which said symbols of said icon are replaced responsive to said replacing step, said pattern array having an array location corresponding to each of said symbols in said icon and having a pointer to indicate the next symbol in said icon to be replaced.

13. An apparatus for using an icon to inform a user of the progress of any task on a computer system, said computer system having a plurality of tasks, said icon having a plurality of symbols, said apparatus comprising:
means for determining in response to each request to perform any task of said plurality of tasks, whether an amount of work required to complete a particular task can be quantified and if it is determined that said amount of work can be quantified, initiating:
means for quantifying said amount of work required to complete said particular task, said particular task being one of said plurality of tasks;
means for dividing said quantified work into a plurality of substantially equivalent task work units, wherein each of said task work units corresponds to one of said plurality of symbols in said icon;
means for presenting said icon on a computer display to said user, said icon containing progress information about said particular task, said progress information being represented as a uniform indication of progress that is independent from said particular task's function;
means for monitoring the progress of said particular task;
means for replacing one of said plurality of symbols with a replacement character when one task work unit has been completed; and
means for repeating said replacing step as said particular task progresses until all of said plurality of symbols have been replaced, thereby indicating the completion of said particular task; and
means for removing said icon from said computer display.

* * * * *